United States Patent
Wen et al.

(10) Patent No.: US 6,942,081 B2
(45) Date of Patent: Sep. 13, 2005

(54) ELECTRORHEOLOGICAL CLUTCH

(75) Inventors: Weijia Wen, Kowloon (HK); Ping Sheng, Kowloon (HK); Kin Lun Chan, New Territories (HK); Chau Kwan Nam, Kowloon (HK)

(73) Assignee: China Patent Investment Limited, Hong Kong (CN)

( * ) Notice: Subject to any disclaimer, the term of this patent is extended or adjusted under 35 U.S.C. 154(b) by 0 days.

(21) Appl. No.: 10/698,371

(22) Filed: Nov. 3, 2003

(65) Prior Publication Data

US 2005/0092570 A1 May 5, 2005

(51) Int. Cl.⁷ .................. F16D 27/00; F16D 29/00
(52) U.S. Cl. ............................. 192/21.5; 192/40
(58) Field of Search ............. 192/21.5, 40, 35, 192/57, 84.31; 188/267.1

(56) References Cited

U.S. PATENT DOCUMENTS

| | | | |
|---|---|---|---|
| 2,709,507 A | | 5/1955 | Trickey |
| 2,809,733 A | | 10/1957 | Perry |
| 4,444,298 A | * | 4/1984 | Stangroom .................. 192/21.5 |
| 4,664,236 A | | 5/1987 | Stangroom |
| 4,782,927 A | | 11/1988 | Sproston et al. |
| 4,896,754 A | * | 1/1990 | Carlson et al. ............. 192/21.5 |
| 5,007,513 A | * | 4/1991 | Carlson ...................... 192/21.5 |
| 5,054,593 A | * | 10/1991 | Carlson ...................... 192/21.5 |
| 5,123,348 A | * | 6/1992 | Henson ...................... 192/21.5 |
| 5,524,743 A | | 6/1996 | Bullough et al. |
| 5,845,753 A | * | 12/1998 | Bansbach ................... 192/21.5 |
| 5,960,918 A | * | 10/1999 | Moser et al. .............. 192/58.4 |
| 5,988,336 A | * | 11/1999 | Wendt et al. .............. 192/21.5 |
| 5,998,336 A | | 12/1999 | Holcomb |
| 6,681,905 B2 | * | 1/2004 | Edmondson et al. ..... 188/267.2 |
| 2001/0041637 A1 | * | 11/2001 | Leeper ...................... 192/21.5 |
| 2003/0111312 A1 | | 6/2003 | Stretch |

FOREIGN PATENT DOCUMENTS

| | | |
|---|---|---|
| GB | 2 083 595 A | 3/1982 |
| JP | 09166155 | 6/1997 |

* cited by examiner

*Primary Examiner*—Rodney H. Bonck
(74) *Attorney, Agent, or Firm*—Buchanan Ingersoll PC

(57) ABSTRACT

An electrorheological clutch comprises drive and driven members that selectively engage by the application of a voltage to an electroheological fluid (ER) provided between the driven and driven members. The drive and driven members are formed with axially-oriented surfaces that define between then axially-oriented spaces for the ER fluid so as to minimize problems with settlement of the ER particles.

11 Claims, 6 Drawing Sheets

FIG. 6 ced
ELECTRORHEOLOGICAL CLUTCH

FIELD OF THE INVENTION

This invention relates to a clutch of the type where the coupling between the input drive member and the output driven member is achieved using an electrorheological fluid.

BACKGROUND OF THE INVENTION

A clutch is a very well known mechanical device used for enabling selective coupling and decoupling of rotating shafts. Conventionally an input drive shaft can be coupled to a driven output shaft. The clutch functions as an interface that connects the two shafts so that they can be either coupled together to rotate at the same speed, partially coupled so that they rotate at different speeds, or completely decoupled. It will also be understood by those skilled in the art that by fixing the output shaft against rotation, a clutch can also act as a brake on the input drive shaft.

Conventionally the clutch provides a physical connection between the input and out shafts either using gearing or commonly a frictional connection. A common problem with clutches, however, especially those using a frictional coupling, is that the clutch usually experiences substantial wear given the often fast rotating shafts, and this wear eventually leads to clutch slippage and finally complete failure.

PRIOR ART

It is known the clutches can be designed using electrorheological (ER) fluids as the coupling between the input and the output. An ER fluid generally comprises a large number of very small particles suspended in an electrically insulating liquid. ER fluids have the property that the viscosity of the fluid can be controlled by the application of an electrical field. In particular, upon the application of a fairly large electrical field (say>1 kV/mm) the viscosity can increase to the extent that the fluid becomes almost solid, ie possessing a finite shear modulus and being capable of transmitting shear stress. This change is often very rapid (eg 0.01 s) and is reversible, ie the ER fluid will return to a fluid state upon removal of the applied electrical field.

A number of attempts have been made to design clutches that use ER fluids and examples can be found in U.S. Pat. Nos. 4,664,236, 4,782,927, 5,524,743 and 5,998,336. Such ER-based clutches have the potential advantages that (1) the transmittable torque can be continuously controlled via an electric field, (2) the response time is very fast, and (3) power consumption is small provided that the current density is low. However there are still a number of problems with these proposed ER clutches that have to date prevented their widespread use. Problems exist for example with finding a suitable way of coupling the input drive shaft to the clutch without requiring the use of fluid-tight couplings that can cause leakage of the ER fluid if they fail, especially for example if they experience substantial vibrations. Problems can also exist with sedimentation effects that may cause the ER particles to settle in the fluid causing the fluid to lose its ER properties.

SUMMARY OF THE INVENTION

According to the present invention there is provided A torque transmission apparatus comprising input and output coupling members arranged on a common axis of rotation, said coupling members being provided within a fluid housing and wherein each said coupling member is formed with a cylindrical portion that extends parallel to said axis of rotation, the inner surface of said cylindrical portion of a first of said coupling members being of a larger diameter than the outer surface of said cylindrical portion of the second of said coupling members, the cylindrical portion of said second coupling member being received within the cylindrical portion of said first coupling member so as to define a cylindrical gap therebetween, wherein an electrorheological fluid is provided in said fluid housing and filling the cylindrical gap between the coupling members, and means being provided for applying an electric field to said electrorheological fluid.

Preferably the fluid housing has a cylindrical inner surface that is slightly larger in diameter than the outer surface of the cylindrical portion of the first coupling member so as to define a further cylindrical gap which is also filled by the electrorheological fluid. Also preferably the first coupling member is formed with an axial shaft that has a diameter smaller than the diameter of the inner surface of the cylindrical portion of the second coupling member so that a further cylindrical gap is defined which is also filled by the electrorheological fluid.

The fluid housing may be provided with a filling aperture for filling the housing with electroheological fluid.

In a preferred embodiment electromagnetic means is provided for bringing a drive shaft into and out of engagement with the first coupling member. This electromagnetic means may comprise a coil arranged around the drive shaft, and the first coupling member is provided with a permanent magnet, whereby upon application of a current to the coil the drive shaft is moved into or out of magnetic engagement with the first coupling member. Preferably a conductive plate is provided at the end of the drive shaft, and a plate of magnetically permeable material is provided between the first coupling member and the drive shaft.

In one embodiment of the present invention the first coupling member is provided with an axial shaft extending towards the drive shaft, and a plate is provided around the shaft, the plate including the permanent magnet means, and a plate is also provided at the end of the drive shaft, the plate at the end of the drive shaft and the plate surrounding the shaft extending from the first coupling member being provided with mechanical engagement means. The mechanical engagement means may, for example, comprise slip lock pins formed on the plate provided at the end of the drive shaft and corresponding grooves formed in the plate provided surrounding the shaft extending from the first coupling member.

According to another broad aspect the present invention also provides torque transmission apparatus comprising first and second coupling members, wherein said first and second coupling members are provided with respective cylindrical coupling surfaces is disposed around the transmission axis of the apparatus, wherein at least one cylindrical gap is defined by said cylindrical coupling surfaces and wherein an electrorheological fluid is provided in said at least one cylindrical gap and wherein means are provided for selectively applying an electrical potential to said coupling members.

According to a still further broad aspect the present invention also provides torque transmission apparatus comprising first and second coupling members, an electroheological fluid disposed between said first and second coupling members, means for selectively applying an electrical potential to said coupling members, and an input drive shaft for selectively engaging a first of said coupling members, wherein said first of said coupling members is provided with permanent magnet means, and wherein electromagnetic means are provided associated with said input drive shaft whereby said drive shaft may be selectively brought into engagement with or out of engagement from said first coupling member.

According to this embodiment, the electromagnetic means preferably comprises a coil disposed around said input drive shaft.

In one embodiment of this aspect of the invention a plate is provided at the end of the input drive shaft for engagement with the first coupling member. Preferably the input drive shaft and the first coupling member engage magnetically, and in engagement the plate provided at the end of the input drive shaft engages a securing plate provided between the input drive shaft and the first coupling member, the securing plate being of a magnetically permeable material and the permanent magnet means being located behind the securing plate.

Preferably the first coupling member is provided with a shaft extending towards the input drive shaft, and a plate is provided around the shaft and is provided with the permanent magnet means, and the plate formed at the end of the input drive member and the plate provided around the shaft are provided with mechanical engagement means.

BRIEF DESCRIPTION OF THE DRAWINGS

Some embodiments of the invention will now be described with reference to the accompanying drawings, in which.

DETAILED DESCRIPTION OF PREFERRED EMBODIMENTS

Figure 1:
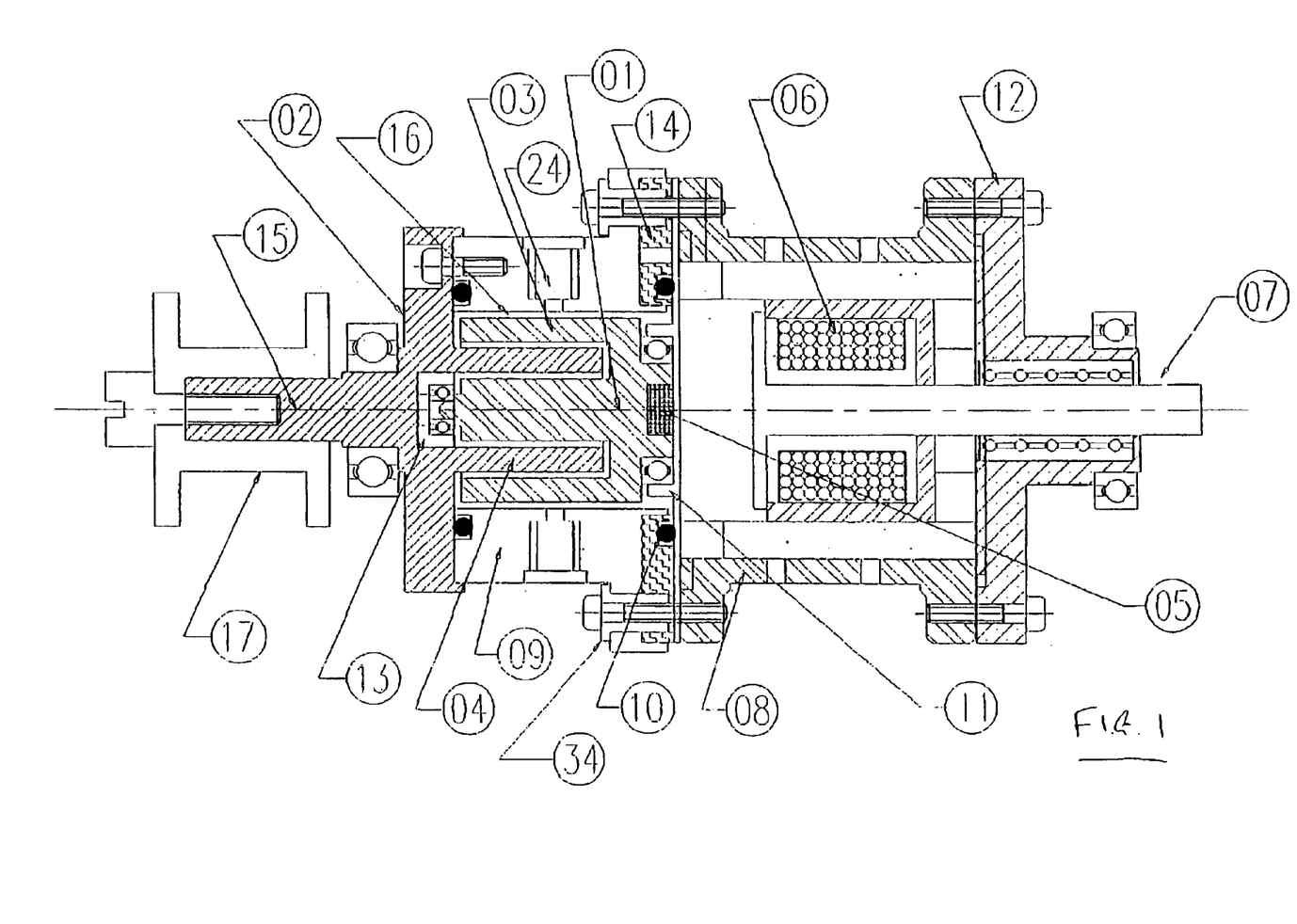
FIG. 1 is a sectional side view through a drive transmission apparatus including an embodiment of the invention.

Referring firstly to FIG. 1, an electrically conductive output driven assembly 2 comprises a cylindrical driven coupling member 4 that is formed integrally with a coaxial output shaft 15 clamped with a hole fitting 17 that enables power to be taken from the output shaft 15 for a desired purpose that is not relevant to the present discussion. An electrically conductive input drive assembly 1 comprises a cylindrical drive coupling member 3 that surrounds the cylindrical driven coupling member 4 with a cylindrical space defined therebetween. A permanent magnet 5 is formed in an end face of the drive coupling member 3 on the axis of rotation of the drive 1 and driven 2 assemblies. The cylindrical driven coupling member 4 of the driven assembly is received within the cylindrical drive coupling member 3, and coupling members 3,4 are enclosed within a fluid housing 9 formed with an injection hole 24.

Within the fluid housing 9 there is provided an electrorheological (ER) fluid (which may be injected through injection hole 24) which occupies the gap 16 defined between the external cylindrical surface of the coupling member 3 and the inner surface of the fluid housing 9, and the gap between the inner cylindrical surface of the coupling member 3 and the outer cylindrical surface of the coupling member 4. Other man radially oriented sections formed at the ends of the coupling members 3,4, it will be appreciated that the space occupied by the ER fluid effectively forms three cylindrical spaces (one defined between the inner surface of coupling member 4 and an external surface of a central shaft extending axially from coupling member 3, a second defined between the external surface of the coupling member 4 and the inner surface of coupling member 3, and the third defined between the external surface of coupling member 3 and the inner surface of the fluid housing) that are coaxial with the principal axis X-X of the transmission apparatus. To prevent fluid leakage, two O-rings are used. One O-ring 10 is located between the driven output assembly 2 and fluid housing 9, the other is located between the fluid housing 9 and a securing plate 11 which is of low magnetic permeability. It should be noted that the space in which is provided the ER fluid primarily consists of cylindrical gaps that are parallel to the axis of rotation of the drive transmission apparatus.

The fluid housing 9, the securing plate 11 and a coil housing 8 are fastened to each other, for example by bolts or any other suitable fastening means. Inside the coil housing 8, there is provided an electromagnetic assembly, which consists of an input shaft 7 fixed on a circular plate and a coil 6 that surrounds the input shaft 7. The input shaft 7 of the electromagnetic assembly is supported by coil shaft bearing holder 12.

To understand the operation of the clutch, it should be understood that in use the input drive assembly 1 acts as positive electrode when appositive voltage is connected to it while the output drive assembly 2 is connected to a negative potential. Insulating rings 14 and insulating rings 34 are used to separate the negatively charged fluid housing 9 from the positively charged coil housing 8 and assembly bolts that fix together housings 8,9. An insulating ring 13 is used to prevent shortcuts between the middle coupling member of drive assembly and the centre of the driven assembly.

Figure 2:
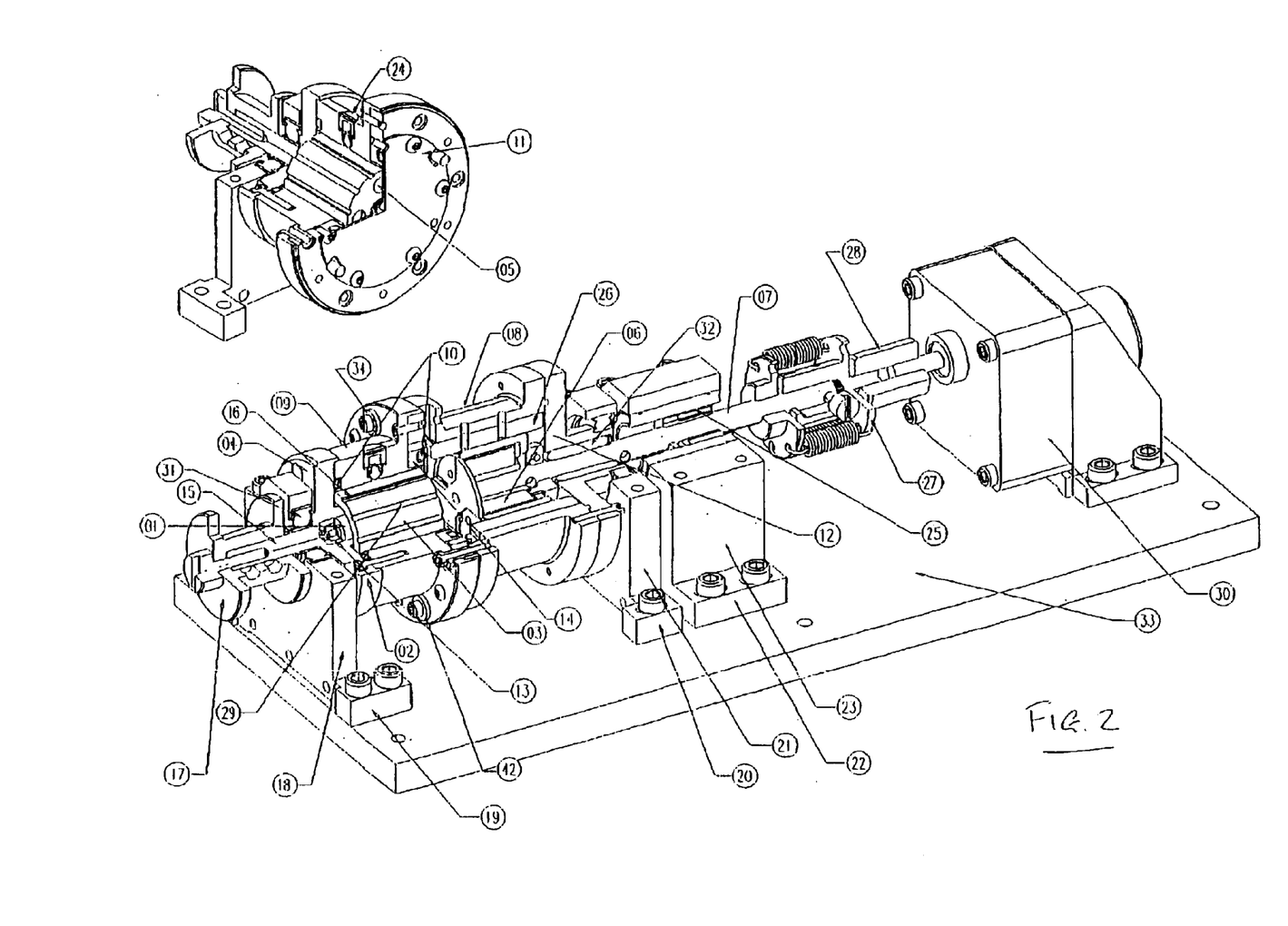
FIG. 2 is a perspective part broken away of the drive transmission apparatus of FIG. 1.

As shown in FIG. 2, the output shaft 15 of the driven assembly is supported by the electrically conductive mount holder 18 through a ball bearing 31. Grooves 29 extending parallel to the axis of the transmission device are formed on the outer surface of the drive coupling member 3 are provided to increase the friction between coupling member 3 and the inner surface of the fluid housing 9. Injection holes 24 on the fluid housing 9 are for refilling ER fluid. The input shaft 7 is supported by mount holder 21 and 23 through linear ball bearing 32 and the coil supply voltage input ring 25. The end of the input shaft 7 is equipped with an adjustment block 27 for allowing the shaft to move backwards and forwards. The adjustment block 27 is connected to a dc servo motor 30 by a coupling member 28. The device is placed on an insulating base plate 33.

In operation, the input shaft 7 is initially driven by a motor or any other means. A dc current is supplied to the coil 6 to provide a magnetic attraction between the drive and driven assemblies because the coil 6 generate a magnetic field that causes a force of attraction between the coil 6 and the permanent magnet 5. When a voltage is applied across the coupling members 3 and 4, the ER fluid becomes solid and torque is transmitted from drive assembly 1 to the driven assembly 2, fluid housing 9 and coil housing 8. The dc current supply to coil 6 may be removed once the driven assembly 2 is, rotating synchronously with input shaft 7.

The magnitude of the transmitted torque can be varied by adjusting the potential difference across the coupling members 3 and 4 which in turn controls the degree of viscosity of the ER fluid and hence the degree of slippage. To disengage the clutch, either the voltage across the coupling member 3 and 4 can be removed so that the ER fluid returns to a fluid state and torque cannot be coupled, and/or a reverse current may be applied to the coil 6 so that input shaft 7 is positively moved away from the plate 11 (ie to the right in FIG. 1). Reversing the current applied to the coil 6 provides a particularly simple and effective way of rapidly disengaging the torque transmission apparatus.

Figure 3:
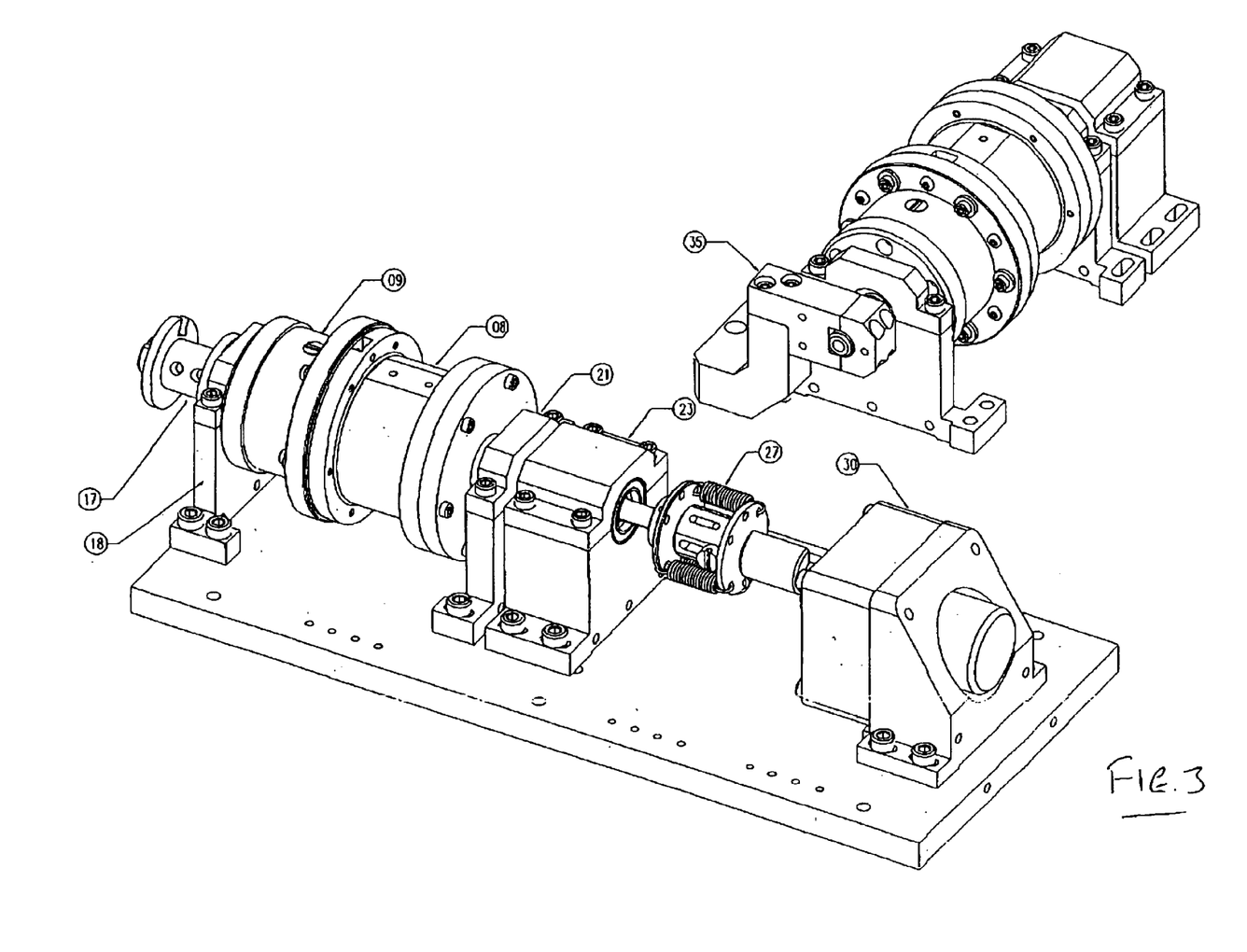
FIG. 3 is a perspective view of the apparatus of FIGS. 1 and 2, showing in particular the use of the apparatus as a brake

FIG. 3 is a perspective overview of a drive transmission apparatus according to an embodiment of the invention which can function as either an electrorheological clutch or brake according to the present invention. To transform the apparatus into a brake, all that is necessary is to fix fitting 17 against rotation, for example using a locating clamp 35. As before when the input shaft 7 is driven by a motor the drive assembly 1 rotates when the ER fluid is in liquid state. However, when a voltage is applied across drive assembly 1 and driven assembly 2, the ER fluid solidifies and the input shaft 7 ceases to rotate because the driven assembly 2 is fixed and cannot rotate.

Figure 4:
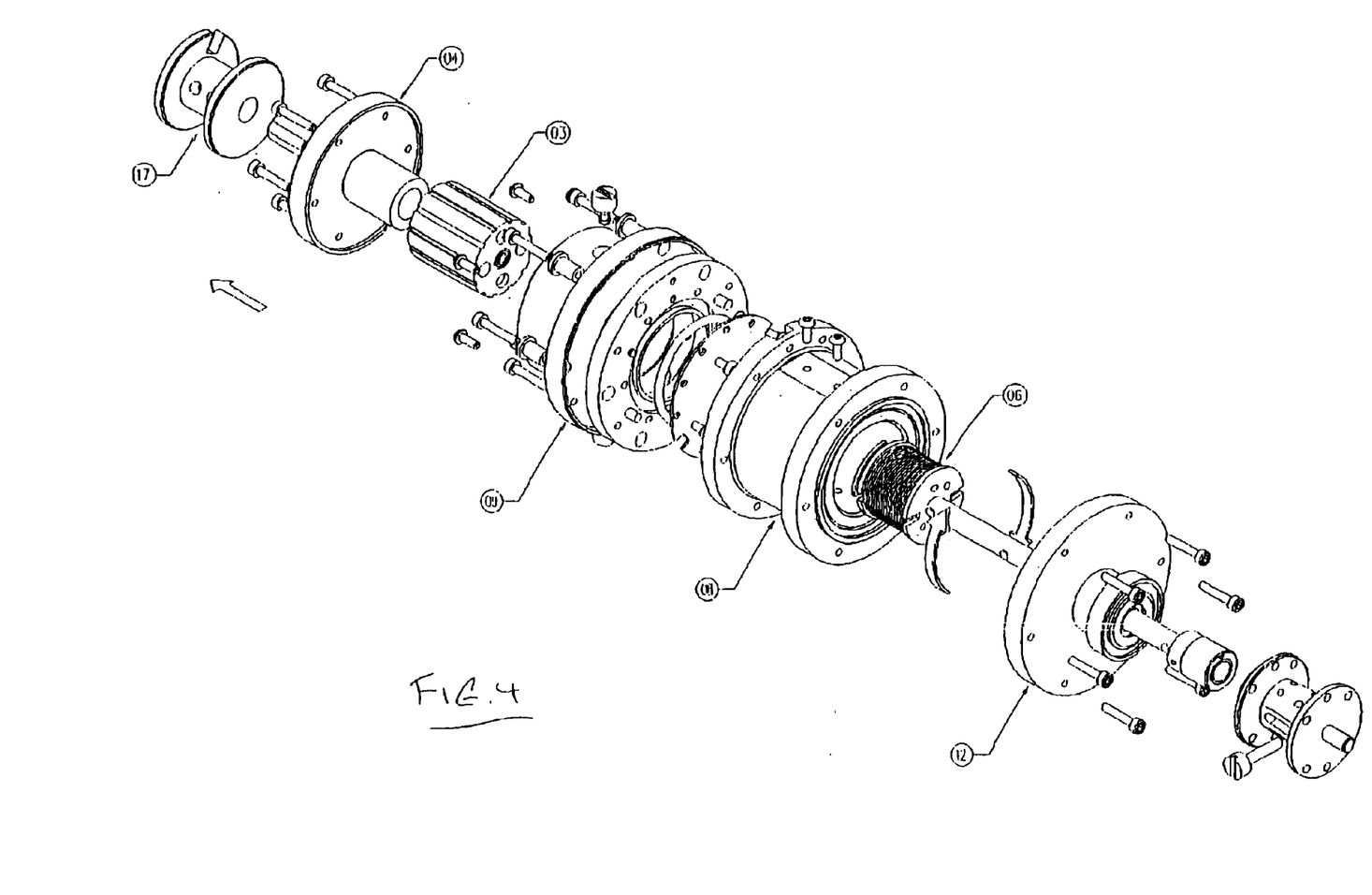
FIG. 4 is an exploded view of the drive transmission apparatus of FIG. 1.

FIG. 4 is an exploded view of the major components of the ER clutch/brake according to this embodiment of the present invention. FIG. 4 shows in particular the assembly of the following elements: coil shaft bearing holder 12, electromagnetic coil 6, coil housing 8, fluid housing 9, drive coupling member 3, driven coupling member 4, and hold fitting.

Figure 5:
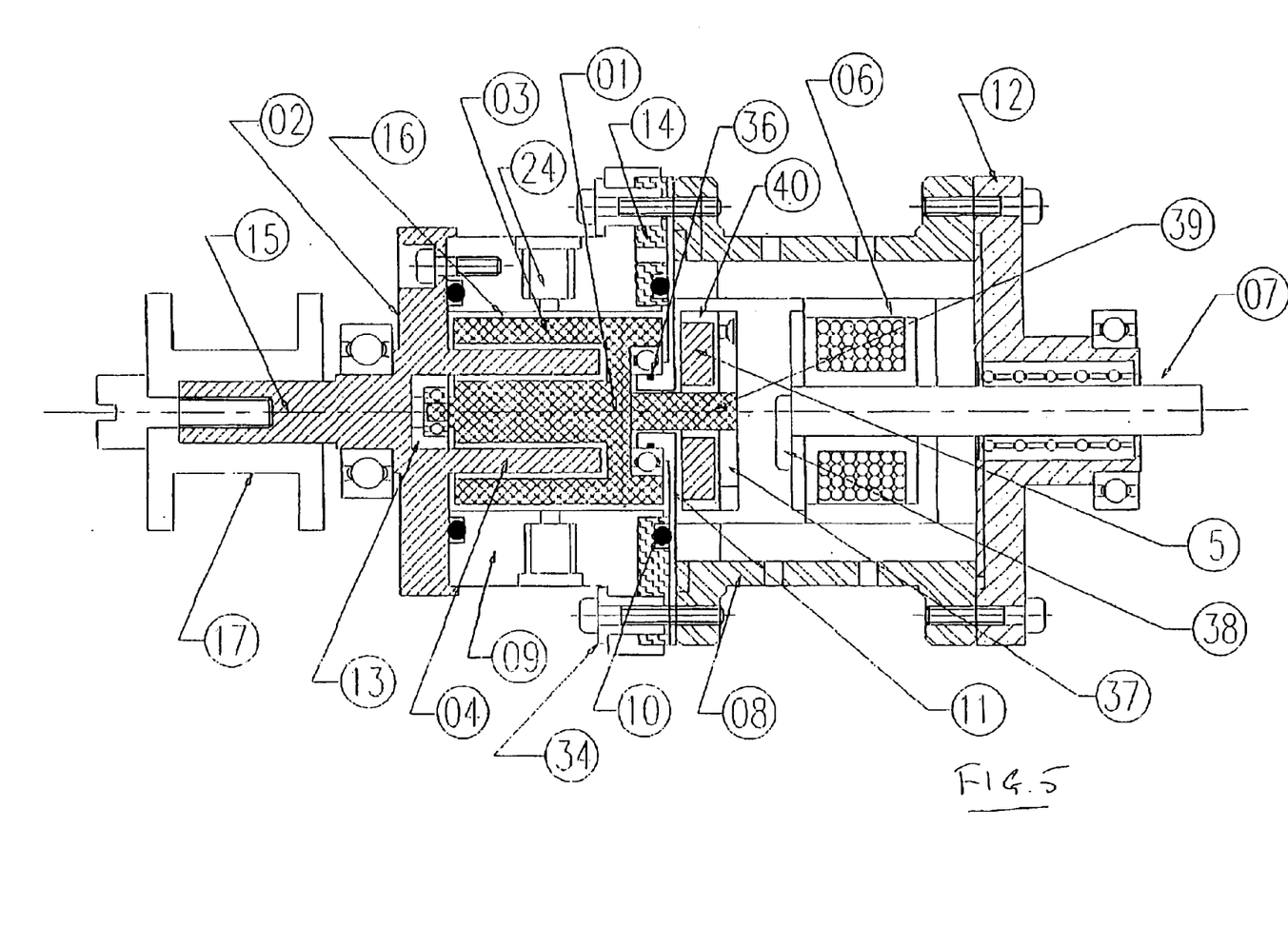
FIG. 5 is a sectional view similar to FIG. 1 but of a second embodiment.

FIG. 5 is a cross-sectional view of an alternative embodiment of the electrorheological clutch/brake shown in FIG. 1. The main difference in this embodiment is that the input shaft 7 is fixed on one side of a circular, electrically conductive plate at the centre, while three slip lock pins 38 are fixed on the other side of the said circular electrically conductive plate. As with the first embodiment a coil 6 is provided surrounding the input shaft 7. A torsion combination axial plate 37 is provided formed as an axial extension of the input drive assembly 1, and this plate 37 is formed with three slip lock grooves 41 (shown in FIG. 6). Permanent magnets 5 are formed in magnet mount plate 40, which is fastened to the torsion combination axial plate 37. A short shaft 39 is fixed at the centre of the drive assembly and extends back towards axial plate 37. Securing plate 11 (with O-ring 10), which is made of a magnetically permeable rigid material, bearing and permanent magnetic mount plate 40 are mounted on short shaft 39.

Figure 6:
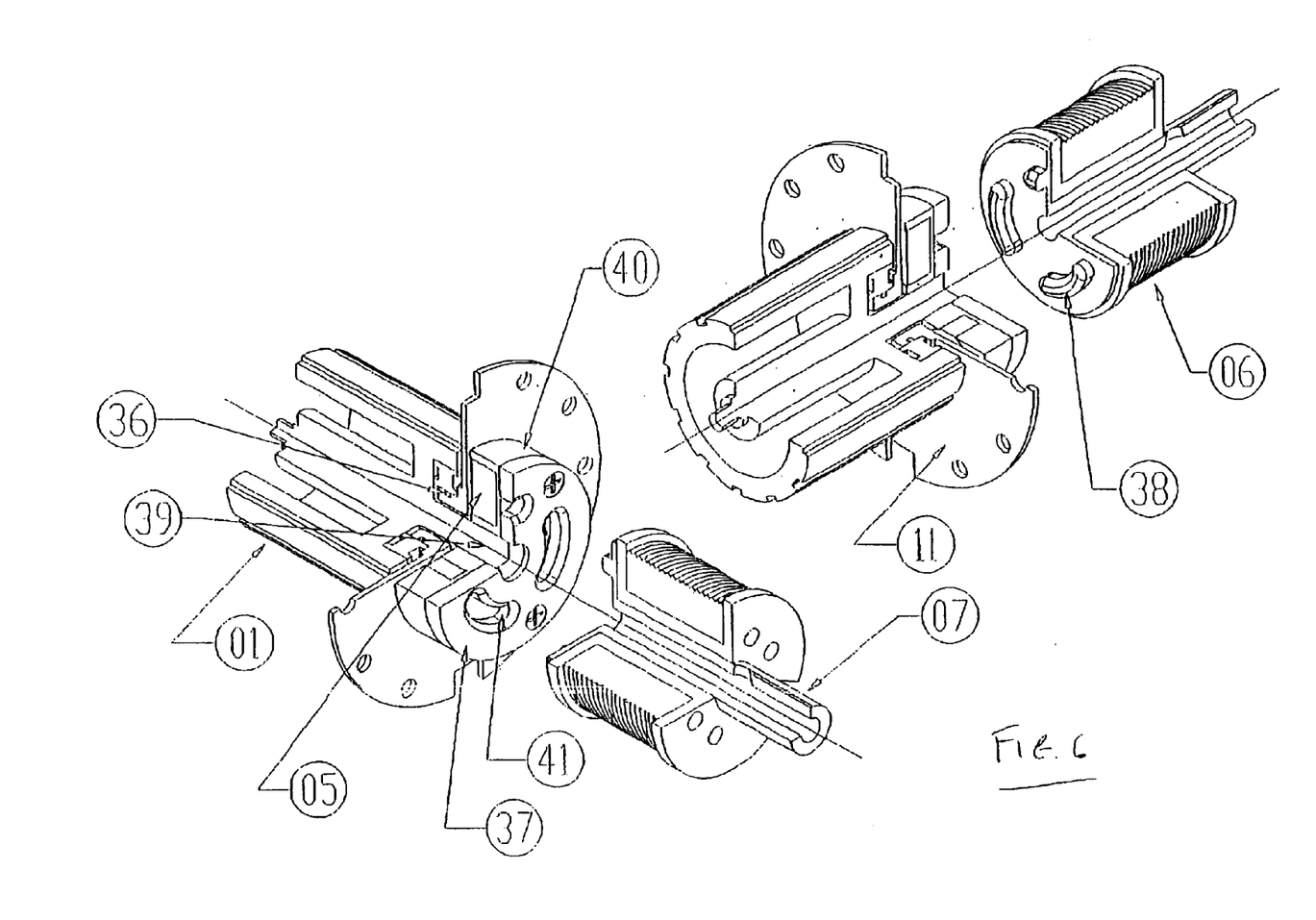
FIG. 6 is an exploded view of a part of an embodiment of the device shown in FIG. 5.

The advantage of this embodiment of the invention is that the electromagnetic assembly can directly drive the drive assembly by the three slip lock pins 38 locked in the corresponding three slip lock grooves on permanent magnetic mount plate 40. FIG. 6 shows part of the embodiment of the device shown in FIG. 5. In this figure, the slip lock grooves 41 and slip lock pins 38 are clearly shown.

What is claimed is:

1. A torque transmission apparatus comprising input and output coupling members arranged on a common axis of rotation, said coupling members bring provided within a fluid housing and wherein each said coupling member is formed with a cylindrical portion that extends parallel to said axis of rotation, the inner surface of said cylindrical portion of a first of said coupling members being of a larger diameter than the outer surface of said cylindrical portion of the second of said coupling members, the cylindrical portion of said second coupling member being received within the cylindrical portion of said first coupling member so as to define a cylindrical gap therebetween, wherein an electrorheological fluid is provided in said fluid housing and filling the cylindrical gap between the coupling members, and means being provided for applying an electric field to said electrorheological fluid, said apparatus further comprising electromagnetic means for bringing a drive shaft into and out of engagement with said first coupling member and comprising a coil arranged around said drive shaft, and wherein said first coupling member is provided with a permanent magnet, whereby upon application of a current to said coil said drive shaft is moved into or out of magnetic engagement with said first coupling member.

2. Apparatus as claimed in claim 1 wherein said fluid housing has a cylindrical inner surface that is slightly larger in diameter than the outer surface of the cylindrical portion of the first coupling member so as to define a further cylindrical gap which is also filled by the electrorheological fluid.

3. Apparatus as claimed in claim 1 wherein said first coupling member is formed with an axial shaft, said axial shaft having a diameter smaller than the diameter of the inner surface of the cylindrical portion of said second coupling member so as to define a further cylindrical gap which is also filled by the electrorheological fluid.

4. Apparatus as claimed in claim 1 wherein said fluid housing is provided with a filling aperture for filling said fluid housing with electrorheological fluid.

5. Apparatus as claimed in claim 1 wherein a conductive plate is provided at the end of said drive shaft, and wherein a plate of magnetically permeable material is provided between said first coupling member and said drive shaft.

6. Apparatus as claimed in claim 1 wherein said first coupling member is provided with an axial shaft extending towards said drive shaft, and wherein a plate is provided around said shaft, said plate including said permanent magnet means, and wherein a plate is provided at the end of said drive shaft, the plate at the end of the drive shaft and the plate surrounding the shaft extending from the first coupling member being provided with mechanical engagement means.

7. Apparatus as claimed in claim 6 wherein said mechanical engagement means comprise slip lock pins formed on the plate provided at the end of said drive shaft and corresponding grooves formed in the plate provided surrounding the shaft extending from the first coupling member.

8. Torque transmission apparatus comprising first and second coupling members, an electrorheological fluid disposed between said first and second coupling members, means for selectively applying an electrical potential to said coupling members, and an input drive shaft for selectively engaging a first of said coupling members, wherein said first of said coupling members is provided with permanent magnet means wherein a plate is provided at the end of said input drive shaft for engagement with said first coupling member, wherein said input drive shaft and said first coupling member engage magnetically, wherein in engagement the plate provided at the end of said input drive shaft engages a securing plate provided between the input drive shaft and the first coupling member, said securing plate being of a magnetically permeable material and said permanent magnet means being located behind said securing plate, and wherein electromagnetic means are provided associated with said input drive shaft whereby said drive shaft may be selectively brought into engagement with or out of engagement from said first coupling member.

9. Apparatus as claimed in claim 8 wherein said electromagnetic means comprises a coil disposed around said input drive shaft.

10. Apparatus as claimed in claim 8 wherein said first coupling member is provided with a shaft extending towards said input drive shaft, a plate being provided around said shaft and being provided with said permanent magnet means, and wherein the plate formed at the end of the input drive member and the plate provided around said shaft are provided with mechanical engagement means.

11. Apparatus as claimed in claim 10 wherein the plate provided at the end of the input drive shift is formed with lock pins, and wherein the plate formed around the shaft extending from the first coupling member is provided with corresponding grooves.

* * * * *